US007267770B2

(12) United States Patent
White et al.

(10) Patent No.: US 7,267,770 B2
(45) Date of Patent: Sep. 11, 2007

(54) CARTRIDGES

(75) Inventors: Leslie R. White, Horseheads, NY (US); Douglas Smith, Lindley, NY (US)

(73) Assignee: The Hilliard Corporation, Elmira, NY (US)

( * ) Notice: Subject to any disclaimer, the term of this patent is extended or adjusted under 35 U.S.C. 154(b) by 337 days.

(21) Appl. No.: 10/684,082

(22) Filed: Oct. 9, 2003

(65) Prior Publication Data

US 2005/0077224 A1     Apr. 14, 2005

(51) Int. Cl.
*B01D 24/10* (2006.01)
*B01D 27/00* (2006.01)
*B01D 27/08* (2006.01)

(52) U.S. Cl. .................. 210/282; 210/286; 210/289; 210/350

(58) Field of Classification Search ............... 210/282, 210/286, 289, 350
See application file for complete search history.

(56) References Cited

U.S. PATENT DOCUMENTS 3,180,825 A * 4/1965 Couvreur et al. ........... 210/678
3,189,179 A * 6/1965 McMichael ................. 210/238
3,965,000 A * 6/1976 Mikule et al. .............. 210/661
5,661,117 A   8/1997 Dufresne ..................... 508/433

OTHER PUBLICATIONS

Alan Grunsky, *EPRI, EHC Fluid Maintenance Guide*, 1st draft, May 2002, Section 5.5 "Ion Exchange".
W.D. Phillips and D.I. Sutton, *Improved Maintenance and Life Extension of Phosphate Esters Using Ion Exchange Treatment in Proc. 10th Int'l Colloquium Tribology*, Esslingen, Germany, Publication No. GSD2654IRPM/1M/0396 by Pall Corporation, 1996.
F.C.J. Brandt, G. Maningley, R. Trost, *A New Means of Purifying Synthetic hydraulic Fluids by Means of Ion Exchangers*, Technical Academy Esslingen, Germany, Apr. 1986.
M. Lasch, H. Stemmeler, and H. Hirsch, *Operating Experience with Different Filter Materials for Cleaning of Fire-Resistant Control Fluids*, late 1980's.
G.F. Wolfe and A. Whitehead, *Experience with Phosphate Ester Fluids as Industrial Steam Turbine-Generator Lubricants*, Lubrication Engineering 34, 8, pp. 413-420 (1977).

* cited by examiner

*Primary Examiner*—Thomas M. Lithgow
(74) *Attorney, Agent, or Firm*—Drinker Biddle & Reath LLP

(57) ABSTRACT

A radial flow cartridge, especially for use with an ion exchange resin, includes inner and outer tubular cages, and a tubular knitted liner extending the length of the cartridge between the inner and outer cages and spaced apart from the outer cage. The resin medium fills the space between the liner and the inner cage. During use, the medium absorbs fluid and expands, stretching the knit liner radially and, thereby filling the space between the liner and the outer cage.

24 Claims, 5 Drawing Sheets

CARTRIDGES

FIELD OF THE INVENTION

The invention relates to cartridges containing loose media that may expand in use, and especially to radial-flow ion-exchange cartridges for use in reducing the Total Acid Number (TAN) of lubrication, insulating, and hydraulic oils.

BACKGROUND OF THE INVENTION

Triaryl phosphates and other phosphate esters have been used as fire-resistant hydraulic fluids and lubricants for some years. A problem with these fluids is that they tend to degrade, especially by hydrolysis if water is present in the fluid, to generate acidic products, potentially including phosphoric acid, that may impair the properties of the fluids and/or corrode the equipment in which they are used. It has therefore been proposed to remove the acid products, and one way of removing them is by means of an ion exchange resin. This has proved to be an extremely successful solution. However, over time, the resin needs to be changed. To facilitate this, it is common to provide the ion exchange resin in a radial-flow cartridge.

In use, the ion exchange resin tends to swell as its water content increases, and to contract as its water content decreases. Thus, it is desirable to fill, store, and supply the cartridges with a relatively low moisture content in the ion exchange resin, both to avoid the possibility of water exuding from the cartridges in storage or handling, and to provide cartridges which are designed to absorb as much water as possible. However, it has been determined that when the ion exchange cartridges are used on fluids having a high initial total acid number (TAN), the expansion of the resin can generate forces sufficient to swell, or even burst, the cartridge.

To prevent bursting, partially filled cartridges have been proposed. The goal was to allow the vacant space in the cartridge to accommodate the expansion of the resin. However, since ion exchange resin is loose, it tends to settle at the bottom of the cartridge, leaving the expansion space at the top end. As such, the resin tends to pack within the cartridge. The tight packing of the resin inhibits upward movement as the resin expands. As such, the sides of the cartridge are, again, subject to excessive forces. In addition, it has been determined that a partially filled cartridge can lead to the development of pockets of open spaces through which the circulating fluid may bypass the resin, reducing the efficiency of the ion exchange.

A need, therefore, exists for an improved ion exchange resin cartridge which is designed to provide efficient moisture removal while reducing the occurrence of bursting.

SUMMARY OF THE INVENTION

It is an object of the invention to provide a radial flow cartridge that can reliably accommodate expansion of a medium contained within the cartridge, and a method of making such a cartridge.

The invention provides a radial flow cartridge having inner and outer tubular cages, and a non-rigid tubular liner extending the length of the cartridge between the inner and outer cages and spaced apart from a first of the cages. A medium fills the space between the liner and the other cage. When the medium expands, the liner stretches or otherwise deforms, allowing the medium to expand radially towards the outer cage.

The invention also provides a method of making a radial flow cartridge that comprises providing a cartridge that has inner and outer tubular cages and a non-rigid tubular liner extending the length of the cartridge between the inner and outer cages and spaced apart from a first of the cages. A medium for filling the cartridge, which medium tends to expand and/or contract in use, is provided. The medium is adjusted to a condition in which its volume is not substantially greater than the minimum volume that it is likely to have in use of the cartridge, and is introduced to fill the space between the liner and the first cage.

Preferably, the medium is located between the liner and the inner cage. The liner is preferably made from an elastic material. Circumferential tension in the liner is designed to allow the medium to expand only as necessary, while restraining unwanted expansion, thereby ensuring that voids do not develop in the medium.

The liner may be spaced from the first cage by one or more circumferential bands that restrict the circumference of the liner to a dimension between those of the inner and outer cages. If the first cage is the outer cage, the band may be elastic. Alternatively, the band may be effectively inelastic, and the medium may expand by expanding the liner to either side of the band.

Alternatively, the liner may be spaced from the first cage by one or more radial spacers extending from the liner to the first cage, which may be in the form of an annular disk, preferably with axial flanges at the rim that engage the liner.

When the medium expands, the liner stretches and/or deforms, allowing the medium to expand radially towards the first cage. The amount of medium is preferably selected such that at its maximum expansion expected during use the medium substantially fills the space available between the inner and outer cages.

BRIEF DESCRIPTION OF THE DRAWINGS

For the purpose of illustrating the invention, there are shown in the drawings forms of the invention which are presently preferred; it being understood, however, that this invention is not limited to the precise arrangements and instrumentalities shown.

DETAILED DESCRIPTION OF THE EMBODIMENTS

Figure 1:
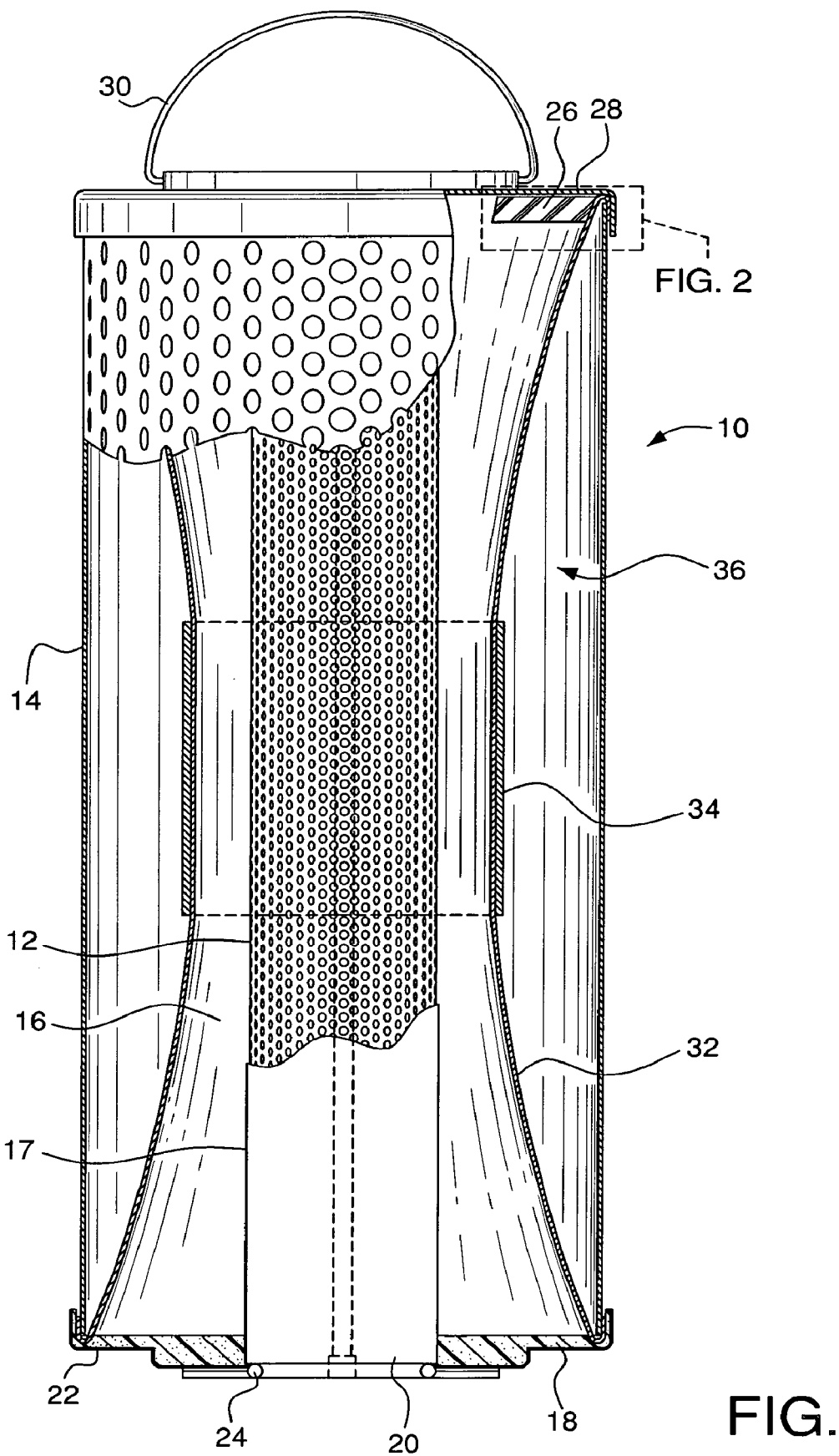
FIG. 1 is an axial elevation view, partly cut away and partly in section, of a first embodiment of an ion exchange cartridge according to the invention.
Figure 1A:
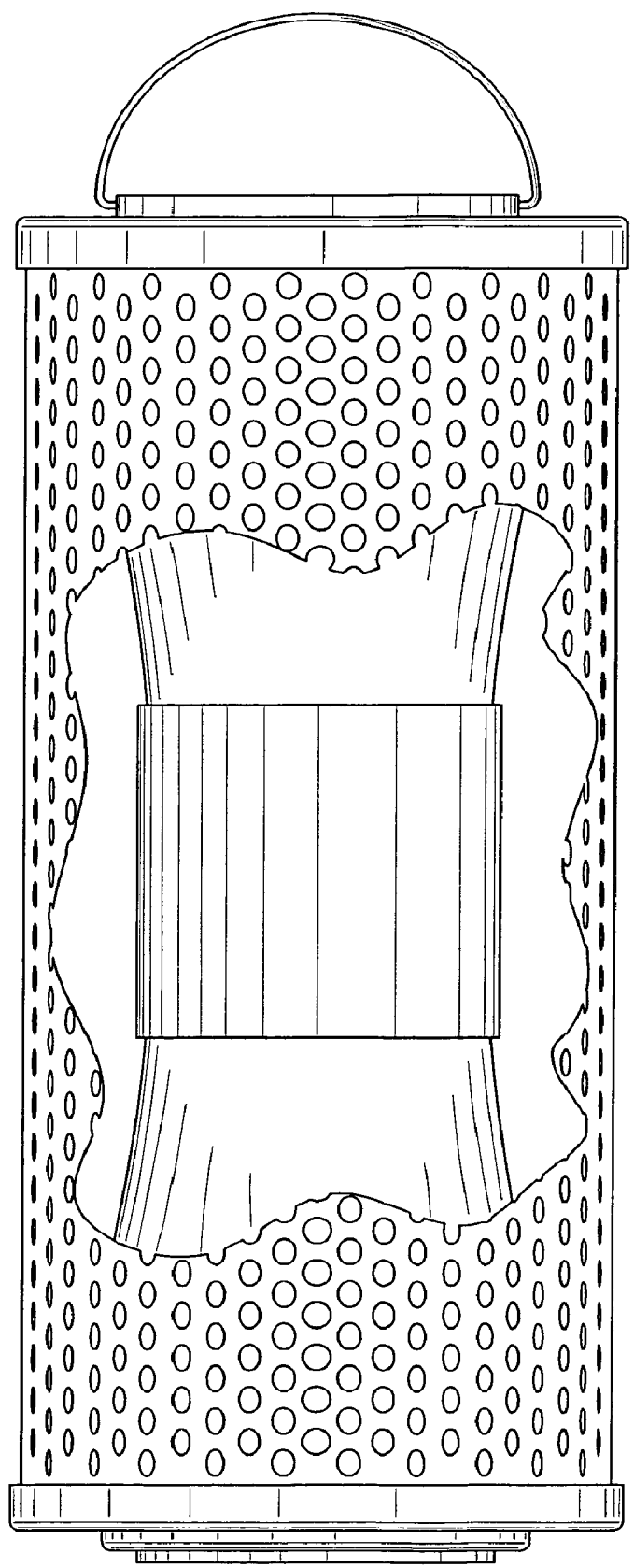
FIG. 1A is a an axial elevation view, partly cut away, of the ion exchange cartridge shown in FIG. 1.
Figure 2:
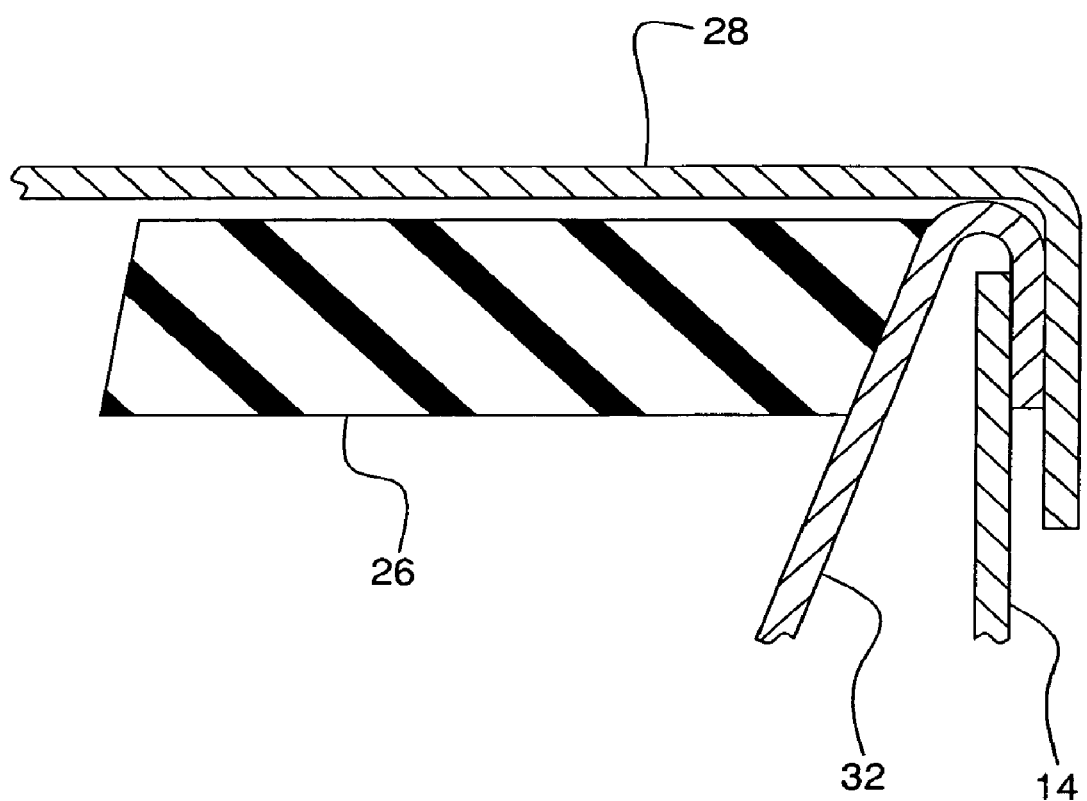
FIG. 2 is an enlarged view of detail FIG. 2 of FIG. 1.

Referring to the drawings, and initially to FIGS. 1, 1A, and 2, one embodiment of an ion exchange cartridge according to the present invention is indicated generally by the reference numeral 10. The cartridge 10 comprises an inner cage 12 and an outer cage 14 in the form of coaxial tubes. The inner cage 12 is of mesh or perforated construction, with holes sufficiently small to prevent beads of ion exchange resin 16, with which the cartridge 10 is filled, from passing into the inner cage. Alternately, a sleeve 17 of material may be disposed about the inner cage. The sleeve is permeable to fluid so as to permit a fluid to pass from inside the inner cage to inside the liner. If a sleeve is used, the sleeve is preferably made from spunbonded continuous filament polyester material. The material may then be 15 mils (380 μm) thick, with a basis weight of 3 oz/sq. yd. (100 g/m2) and a Frazier airflow of 192 cfm (airflow of 192 cubic feet per square foot per minute at a differential pressure of 0.5 inch water (58.5 m/s at 124.5 Pa)).

As will be explained below, the resin 16 does not come into direct contact with the outer cage 14. However, the outer cage 14 may be made of similar mesh or perforated material as the inner cage 12. The cages may be made of perforated, louvered, or expanded cold-rolled or stainless steel. The steel may be coated or plated for corrosion resistance. The cages 12 and 14 may be straight or spiral continuous seamed, spot welded or can seamed, to form an open cylinder.

The inner and outer cages 12, 14 are joined at one end by a lid or end cap 22. The end cap 22 is preferably clamped or otherwise secured to the outer cage. A sealing disk 18 is preferably located inside the cap 22. The sealing disk 18 is preferably formed from a urethane material. The axial ends of the inner and outer cages 12, 14 are both preferably embedded into the urethane, thereby providing a fluid tight seal between the ends of the inner and outer cages. The sealing disk 18 and end cap 22 have a central opening 20 that opens into the space inside the inner cage 12. A seal or gasket 24, such as an O-ring, may be incorporated around the opening 20 to inhibit leakage between a fluid inlet or outlet that is intended to be connected to the cartridge in use.

A second end cap 28 is swaged or otherwise attached to the opposite end of the canister 10. A second sealing disk 26 is placed between the ends of the inner and outer cages. The second sealing disk 26 is preferably made from urethane which is poured into the canister between the inner and outer cages. A bail 30 may be attached to the end cap 28 to assist in inserting the cartridge 10 into, and removing the cartridge from, a cartridge housing (not shown) of an apparatus with which the cartridge is to be used.

A tubular liner 32 is arranged between the inner and outer cages 12, 14. The liner 32 is preferably attached at its axial ends to either the outer cage 12, the inner cage 14 or the end caps. In the illustrated embodiment, the attachment is provided by folding the ends of the liner over the edges of the outer cage, then either embedding the combination in the urethane sealing disks 18, 26 or using the end caps 22, 28 to secure the liner ends. Alternately, the liner could be just attached to the sealing disks 18, 26.

One or more retaining bands 34 are located in the middle of the liner 32. The retaining band 34, or each of the retaining bands, acts as a restriction on the diameter of the liner. In the illustrated embodiment, the retaining band restricts the liner to a diameter about halfway between the diameters of the inner and outer cages 12, 14. Thus, the retaining band 34 forms the liner into a tube with concave sides. As discussed above, the ion exchange resin 16 fills the space between the liner 32 and the inner cage 12. The space 36 formed between the liner 32 and the outer cage 14 is initially empty.

The liner 32 is preferably made from a tubular knit sleeve of polyester material. The tubular knit structure is highly beneficial since the absence of an axial seam removes a major point of weakness. The knit sleeve also has sufficient elasticity such that, when the cartridge is initially filled, the sleeve can contain the ion exchange resin 16 in the region adjacent to the inner cage 12. However, during use, as the ion exchange resin absorbs acid and water and begins to expand, the liner 32 will stretch rather than tear. The liner 32 thus allows the resin to expand towards the outer cage 14, into the space 36, while still retaining it in a continuous and fairly even bed over the length and circumference of the cartridge 10. In one preferred embodiment, the liner is made from the 150/50 200/48 #5 knit BEANE BAG TM material supplied by C S & S Filtration, of Chattanooga, TN, under the item number 2K0510.5-045. This material has a weight of 13.92oz/yd$^2$, a tensile strength of 76.5 lbf in the machine direction and 52.5 lbf across the machine direction, an elongation before failure of 5.109" for an initial sample size of 3" between jaws (170.3%) in the machine direction and 4.494" for an initial sample size of 3" between jaws (149.8%) across the machine direction. The material has a Frazier airflow permeability of 116.3, and a Mullens burst strength of at least 60.0 psi.

Another possible material for the liner is the antistatic 150/50 150/50 BEANE BAG TM material supplied by C S & S Filtration under the item number 2K128.0-050 AS. The antistatic material contains a minor proportion of carbon fibers. This material has a weight of 15.21 oz/yd , a tensile strength of 56.5 lbf in the machine direction and 64 lbf across the machine direction, an elongation before failure of 4.170" for an initial sample size of 3" between jaws (139%) in the machine direction and 2.447" for an initial sample size of 3" between jaws (81.6%) across the machine direction. The material has a Frazier airflow permeability of 16.95, and a Mullens burst strength of at least 60.0 psi. However, the antistatic material is not generally necessary.

The retaining band or bands 34 is or are preferably formed from tubular knit polyester material and has a length of approximately ¼ to ¾ of the length of the cartridge 10. In one preferred embodiment, the retaining band 34 is made from material the same as that of the liner 32, but with a smaller unstretched diameter. It is also contemplated that the liner 32 could be formed with more dense or a different type of knitting in the central area where the retaining band is in FIG. 1. The variation in the knit liner would cause the liner to behave in much the same way as the liner in FIG. 1 when subjected to expansion of the resin (i.e., the portion of the liner where the knit is less dense or selected to facilitate expansion would stretch more than the central portion of the liner.) This variation of the invention eliminates the need for a retaining band.

To assemble the cartridge 10, one end cap 22, including the gasket assembly 24, is preferably swaged or otherwise attached to the end of the inner cage 12. Urethane is poured into the canister to form the sealing disk 18, and the outer cage 14, with the liner 32 folded over its end, is inserted into the end cap, embedding into the urethane. The retaining band or bands 34 is or are then positioned around the middle of the liner 32, if that has not already been done.

The liner 32 is also folded over the other end of the outer cage 12. The liner 32 is drawn sufficiently taut lengthways that it adopts the curved shape shown in FIG. 1. The middle part is narrowed to the diameter of the retaining band 34, and the liner bells out smoothly at either end to the diameter of the outer cage 12. A measured quantity of the resin 16 is poured in between the inner cage 14 and the liner, filling the cartridge to within about ½" of the top. That end is then closed by pouring in urethane and allowing it to set to form the sealing disk 26. The end cap 28 is placed over the urethane sealing disk 26, and swaged or otherwise attached to the end of the inner cage 12. A bail 30 is then added.

One suitable ion exchange resin for use in the cartridge 10 for removing phosphoric acid from phosphate ester fluids is Hilite E, supplied by The Hilliard Corporation, of Elmira, N.Y. This resin is supplied in the form of approximately 40 mesh spherical beads. This bead size typically weighs approximately 40 lbs/cu. ft. For use in the cartridge 10, it has been determined that the weight of resin can be reduced by first drying the resin using warm air. This reduces the density to approximately 30 lbs/cu. ft. The drying process, thus, reduces the overall weight of a batch of the resin by approximately 35%.

As an example of suitable dimensions, an ET 718 cartridge is approximately 18" long, 7.5" outside diameter, 2³⁄₃₂" to 3½" inside diameter at the gasket 24, and weighs approximately 20 lbs when dry. An ET 119 cartridge is approximately 19" long and 11" in diameter, with a 2³⁄₃₂" diameter inner cage, and contains about 1 cubic foot of ion exchange resin. When a cartridge as shown in FIG. 1 is charged with Hilite E ion exchange resin, a liner 32 of tubular polyester material having an unstretched diameter of approximately 4⅝" to 5¾" may be suitable.

Figure 3:
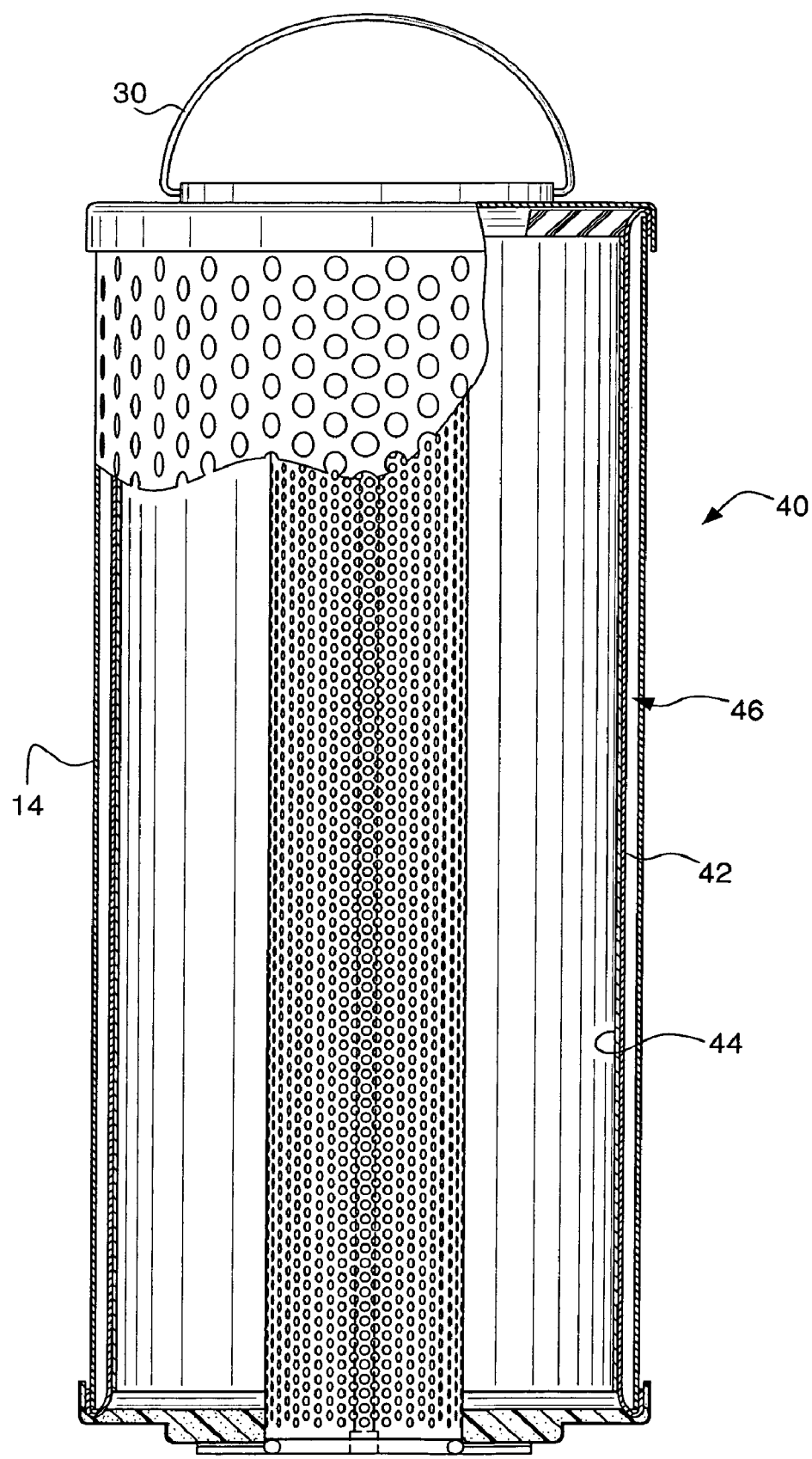
FIG. 3 is a view similar to FIG. 1 of a second embodiment of an ion exchange cartridge according to the invention.

Referring now to FIG. 3, a second embodiment of the cartridge according to the invention is shown and generally indicated by the reference numeral 40. This cartridge 40 is similar to the cartridge 10 shown in FIGS. 1 and 2, except that a retaining band 44 extends inside the liner 42 almost the entire length of the liner. As a result, the liner adopts a largely tubular configuration, with only short end regions that are unsupported by the retaining band 44. These ends spread out to wrap over the ends of the outer cage 14.

The assembly and use of the cartridge 40 shown in FIG. 3 are similar to those of the cartridge 10 shown in FIGS. 1 and 2. However, when the ion exchange resin 16 swells the sleeve 42 and retaining band 44 expand along their entire length. Consequently, the entire space 46 between the sleeve 42 and the outer cage 14 is fully available for expansion. As shown in FIG. 3, this allows an expansion space 46 that is narrower radially than the middle part of the expansion space 36 in FIG. 1, for the same expansion of the ion exchange resin 16.

As with the embodiment shown in FIGS. 1 and 2, instead of using a retaining band, the liner may be formed with different or denser knitting in the region where the retaining band is shown in FIG. 3.

Figure 4:
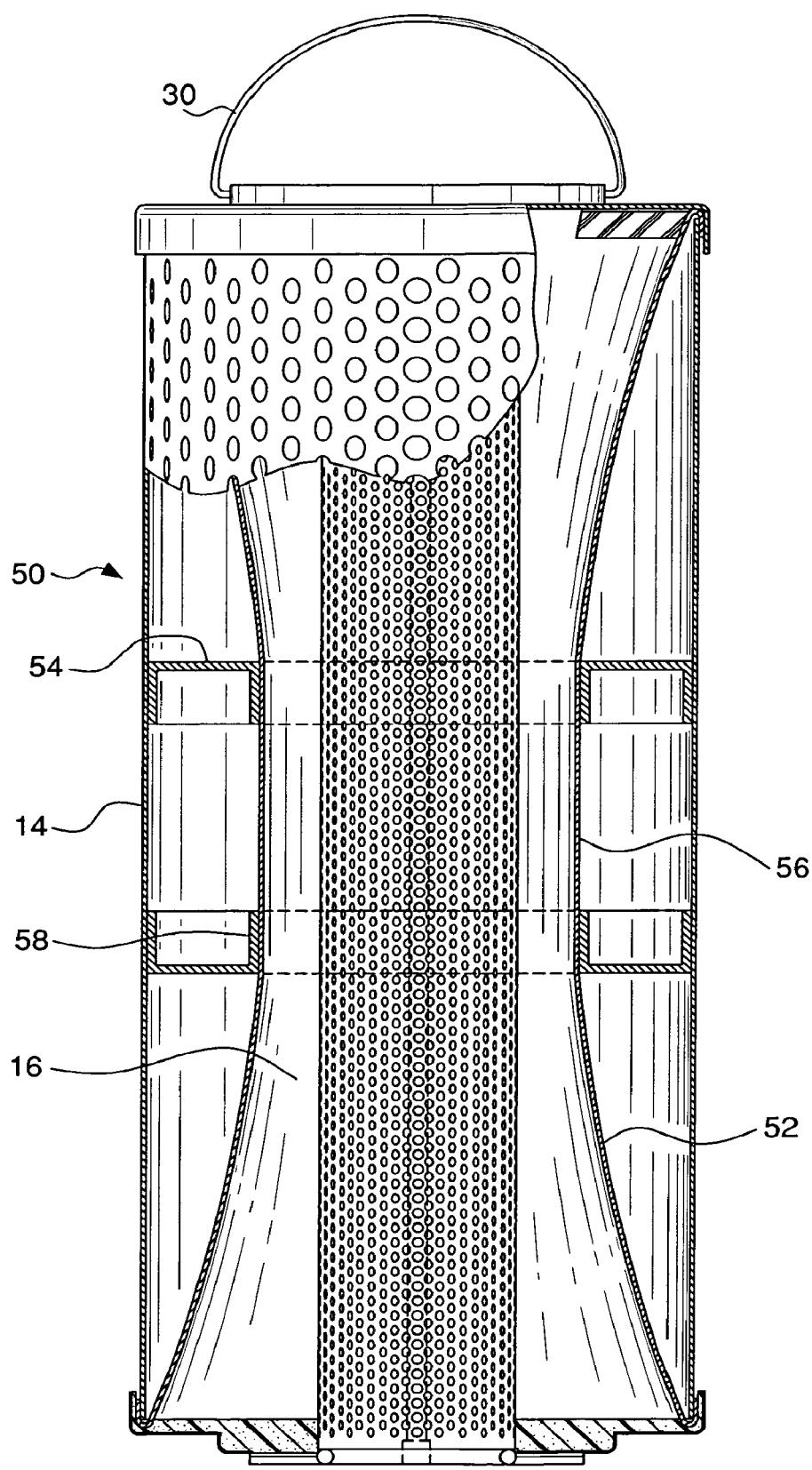
FIG. 4 is a view similar to FIG. 1 of a third embodiment of an ion exchange cartridge according to the invention.

Referring now to FIG. 4, a third embodiment of the cartridge is shown and generally indicated by the reference numeral 50. This cartridge is similar to the cartridge 10 shown in FIG. 1, except that there is no retaining band 34. Instead, the liner 52 is separated from the outer cage 14 by two spacer rings 54 to form an expansion space 56. The spacer rings 54 each consist of an annular disk with an axial flange 58 at the inner edge which rests against the liner 52. The flange 58 of the spacer ring 54 is designed to inhibit expansion of the liner 52. The free end of the flange 58 may be angled radially outward, so that the liner 52 does not contact the edge and tear. Alternately the free edge of the flange 58 may be carefully smoothed and rounded. The spacer rings 54 may be fixed to the outer cage 14 in any appropriate way.

The use of two spacer rings 54, instead of a single retaining band 34 permits the liner 52 to stretch, and the ion exchange resin 16 to expand outwards, between the spacer rings as well as outside them.

Although specific embodiments of the invention have been described, various modifications are possible. In particular, although three embodiments have been described, those skilled in the art will understand how parts and features from different embodiments may be combined to produce a variety of permutations.

It is also contemplated that the present invention can be modified to include a sensor which detects and indicates when the cartridge is substantially filled. For example, a sensor could be incorporated which includes contacts on the liner and the outer cage such that when the liner expands and the contacts touch, a light or other indicator is activated. It is also contemplated that one or both ends of the cartridge could include a removable access lid that permits removal and replacement of the resin.

The present invention may be embodied in other specific forms without departing from the spirit or essential attributes thereof and, accordingly, reference should be made to the appended claims, rather than to the foregoing specification, as indicating the scope of the invention.

What is claimed is:

1. A radial flow cartridge for treating a fluid, the cartridge comprising:
   an inner tubular cage having a plurality of openings formed in it to permit passage of a fluid;
   an outer tubular cage having a plurality of openings formed in it to permit passage of a fluid, the outer cage being disposed about the inner cage;
   a non-rigid tubular liner permeable to a fluid, located between the inner and outer cages and spaced apart from the outer cage;
   an expandable fluid treatment medium contained between the inner cage and the liner; and
   lids closing off the space between the ends of the inner and outer tubular cages.

2. The cartridge according to claim 1, wherein said medium is an ion exchange resin.

3. The cartridge according to claim 1, wherein the liner is elastic.

4. The cartridge according to claim 1, wherein the liner is made of a woven material that permits radial expansion.

5. The cartridge according to claim 1, wherein a portion of the liner is radially restrained.

6. The cartridge according to claim 1, wherein the liner is spaced from the outer cage by at least one circumferential band that inhibits radial expansion of a portion of the liner.

7. The cartridge according to claim 1, wherein the liner is spaced from the outer cage by at least one circumferential elastic band.

8. The cartridge according to claim 1, wherein the liner is spaced from the outer cage by at least one circumferential band, wherein the band is made of a woven material that permits radial expansion.

9. The cartridge according to claim 6, wherein the band is substantially inelastic, and wherein the medium may expand by expanding the liner to either side of the at least one band.

10. The cartridge according to claim 1, wherein the liner is spaced from the outer cage by one or more radial spacers extending from the liner to the outer cage.

11. The cartridge according to claim 10, wherein the one or more spacers are in the form of an annular disk.

12. The cartridge according to claim 10, wherein the one or more spacers include flanges that engage with the liner.

13. The cartridge according to claim 1, where the amount of medium is selected such that at its maximum expansion expected to occur in use the medium substantially fills the volume between the inner and outer cages.

14. The cartridge according to claim 1, wherein the medium substantially fills the space between the liner and the inner cage.

15. A method of making a radial flow cartridge, comprising:
   providing a cartridge that has inner and outer fluid permeable tubular cages and a non-rigid fluid permeable tubular liner extending the length of the cartridge between the inner and outer cages and spaced apart from the outer cage;

providing a fluid treatment medium for use in the cartridge, which medium tends to expand and/or contract in use;

introducing the medium into the space between the liner and the inner cage; and closing off with lids the space between the inner and outer cages at the ends of the cages.

16. The method according to claim 15, wherein the liner is elastic, and wherein the method comprises the step of restricting the radial expansion of a portion of the liner.

17. The method according to claim 15, further comprising the step of placing at least one circumferential band around the outside of the liner, the radial band restricting radial expansion of a portion of the liner.

18. The method according to claim 15, further comprising the step of spacing the liner from the outer cage by one or more radial spacers which extend between the liner and the outer cage.

19. The method according to claim 15, further comprising the step of introducing into the cartridge a quantity of the medium that at its maximum anticipated expansion during use substantially fills the volume between the inner and outer cages.

20. The method according to claim 15, further comprising the step of substantially filling the space between the liner and the inner cage with the medium.

21. A radial flow cartridge to treat a fluid, the cartridge comprising:

an inner tubular cage having a plurality of openings formed in it to permit passage of a fluid, the inner cage having first and second axial ends;

an outer tubular cage having a plurality of openings formed in it to permit passage of a fluid, the inner cage having first and second axial ends, the outer cage being disposed about and spaced apart from the inner cage;

a first lid attached to the inner and outer cages so as to close off the space between first axial ends of the inner and outer cages;

a second lid attached to the inner and outer cages so as to close off the space between second axial ends of the inner and outer cages;

a non-rigid tubular liner located between the inner and outer cages and spaced apart from the outer cage, the liner being permeable to at least one fluid; and a fluid treatment medium disposed between the liner and the inner cage, the medium adapted to expand upon absorption of fluid, wherein the liner is adapted to deform upon expansion of the medium so as to permit the medium to expand radially toward the outer cage.

22. The cartridge according to claim 21, wherein the liner is made of a woven material that permits radial expansion.

23. The cartridge according to claim 22, wherein the woven material is a knit polyester.

24. The cartridge according to claim 21, wherein the liner has first and second axial ends, the first axial end being attached between the outer cage and the first lid, the second axial end being attached between the outer cage and the second lid.

* * * * *